(12) United States Patent
Sekine et al.

(10) Patent No.: US 10,161,810 B2
(45) Date of Patent: Dec. 25, 2018

(54) HONEYCOMB SANDWICH STRUCTURE AND METHOD OF MANUFACTURING HONEYCOMB SANDWICH STRUCTURE

(71) Applicant: MITSUBISHI ELECTRIC CORPORATION, Chiyoda-ku (JP)

(72) Inventors: Kazushi Sekine, Chiyoda-ku (JP); Hajime Takeya, Chiyoda-ku (JP); Hiromi Seko, Chiyoda-ku (JP); Yoshikazu Tanaka, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 464 days.

(21) Appl. No.: 14/893,844

(22) PCT Filed: Dec. 19, 2013

(86) PCT No.: PCT/JP2013/084057
§ 371 (c)(1),
(2) Date: Nov. 24, 2015

(87) PCT Pub. No.: WO2014/199532
PCT Pub. Date: Dec. 18, 2014

(65) Prior Publication Data
US 2016/0109303 A1     Apr. 21, 2016

(30) Foreign Application Priority Data
Jun. 10, 2013 (JP) ................... 2013-121506

(51) Int. Cl.
*G01K 11/12* (2006.01)
*B32B 3/12* (2006.01)
(Continued)

(52) U.S. Cl.
CPC ....... *G01K 11/125* (2013.01); *G01D 5/35316* (2013.01); *G01D 5/35377* (2013.01); *G01K 11/32* (2013.01); *G01K 11/3206* (2013.01)

(58) Field of Classification Search
CPC . G01J 5/08; G01J 5/0821; G01K 1/14; G01K 13/10; G01K 11/12; G01N 21/01;
(Continued)

(56) References Cited

U.S. PATENT DOCUMENTS 4,836,030 A     6/1989  Martin
9,882,297 B2 *  1/2018  Regnier ............... H01R 12/721
(Continued)

FOREIGN PATENT DOCUMENTS

JP    2001-004440 A    1/2001
JP    2005-265473 A    9/2005
(Continued)

OTHER PUBLICATIONS

Extended European Search Report dated Oct. 21, 2016 in Patent Application No. 13886867.4.
(Continued)

*Primary Examiner* — Gail Kaplan Verbitsky
(74) *Attorney, Agent, or Firm* — Oblon, McClelland, Maier & Neustadt, L.L.P.

(57) ABSTRACT

A honeycomb sandwich structure formed of face skin materials made of fiber reinforced plastics and a honeycomb core has a structure in which an optical fiber sensor structure is embedded in an adhesive layer formed between the face skin materials and the honeycomb core. With this, it is possible to provide a honeycomb sandwich structure and a method of manufacturing the honeycomb sandwich structure that enable precise thermal control to be implemented even when a thermal control device is bonded onto a surface of the (Continued)

honeycomb sandwich structure and enable evaluation of a temperature with high resolution and high accuracy.

4 Claims, 6 Drawing Sheets

(51) Int. Cl.
    *G01D 5/353*     (2006.01)
    *G01K 11/32*     (2006.01)

(58) Field of Classification Search
CPC ... G01N 3/2842; B01D 46/2418; B01J 35/04; F01N 3/2842
USPC ....... 374/130, 137, 166, 208, 163, 160, 161, 374/141
See application file for complete search history.

(56) References Cited

U.S. PATENT DOCUMENTS

| | | | |
|---|---|---|---|
| 2005/0105584 A1* | 5/2005 | Ichikawa | G01N 25/18 374/44 |
| 2005/0205766 A1 | 9/2005 | Sawada | |
| 2007/0242728 A1* | 10/2007 | Althofer | F01N 13/008 374/208 |
| 2013/0034324 A1 | 2/2013 | Laing et al. | |
| 2016/0061758 A1* | 3/2016 | Nakatani | G01N 3/60 374/5 |
| 2018/0283785 A1* | 10/2018 | Okumura | F26B 3/347 |

FOREIGN PATENT DOCUMENTS

| | | | | |
|---|---|---|---|---|
| JP | 2009300378 A | * | 12/2009 | ......... F28D 15/0275 |
| JP | 4532425 B2 | | 8/2010 | |
| JP | 2013-156200 A | | 8/2013 | |
| JP | WO 2017150339 A1 | * | 9/2017 | ............. G01K 11/32 |
| WO | WO 90/14943 A1 | | 12/1990 | |

OTHER PUBLICATIONS

International Search Report dated Apr. 1, 2014, in PCT/JP2013/84057 filed Dec. 19, 2013.

* cited by examiner

SECTIONAL VIEW

FIG. 8A

SECTIONAL VIEW
ALONG A-A'

FIG. 8B

SECTIONAL VIEW
ALONG B-B'

HONEYCOMB SANDWICH STRUCTURE AND METHOD OF MANUFACTURING HONEYCOMB SANDWICH STRUCTURE

TECHNICAL FIELD

The present invention relates to a honeycomb sandwich structure formed of face skin materials made of fiber reinforced plastics and a honeycomb core, including an optical fiber sensor that is a temperature sensor, and also to a method of manufacturing the honeycomb sandwich structure.

BACKGROUND ART

For construction of an artificial satellite, a honeycomb sandwich structure formed of face skin materials made of fiber reinforced plastics and a honeycomb core, which is lightweight with high stiffness, is generally used. In particular, the honeycomb sandwich structure having high stiffness is used in a mission mounted structure.

However, thermal deformation occurs in the honeycomb sandwich structure due to a change in thermal environment on an orbit, such as sunlight heat input and heat generation of mounted equipment. Therefore, an angle of an Earth-oriented axis in mission equipment such as mounted camera and antenna varies. In particular, in a stationary satellite located about 36,000 kilometers away from the Earth, even a slight variation in the angle of the oriented axis significantly lowers accuracy of Earth observation and positioning.

Therefore, it is important to maintain a temperature of the honeycomb sandwich structure as uniform as possible through thermal control using a heater or the like so as to suppress the thermal deformation. It is also necessary to measure the temperature of the honeycomb sandwich structure on the orbit with high resolution and high accuracy so that precise thermal control is implemented.

As one of sensors for evaluating a temperature of a structure made of fiber reinforced plastics or other plastic, an optical fiber sensor has been proposed. The optical fiber sensor is a small-sized lightweight temperature sensor, and is sometimes used in a state of being embedded in the structure or in a state of being bonded to a surface of the structure.

As one of the above-mentioned structures including the optical fiber sensor, there exists, for example, an artificial satellite equipment panel having a surface on which an optical fiber sensor including a fiber Bragg grating (FBG) that changes the Bragg wavelength in a reflectance spectrum in accordance with the temperature is bonded. Specifically, in order to measure a temperature of mounted electronic equipment and a temperature of an equipment panel present immediately therebelow, the optical fiber sensor is bonded to a surface of the equipment panel corresponding to a position at which the electronic equipment is to be mounted (see, for example, Patent Literature 1).

CITATION LIST

Patent Literature

[PTL 1] JP 4532425 B2

SUMMARY OF INVENTION

Technical Problem

However, the related art has the following problems.
In the related art disclosed in Patent Literature 1, the optical fiber sensor is bonded onto the surface of the equipment panel for the temperature measurement, as described above. Further, together with the optical fiber sensor, thermal control devices such as a heater, an optical solar reflector (OSR), and a multi layer insulation (MLI) are bonded onto the surface of the equipment panel.

In general, a thickness of an adhesive layer formed on the surface increases to bond the optical fiber sensor onto the surface. Therefore, in a case where the thermal control devices are bonded onto the adhesive layer that is formed in accordance with a diameter of the optical fiber sensor, the thickness of the adhesive layer is large. Therefore, there is a problem in that thermal transfer (thermal conduction) is lowered to result in thermal control performance degradation.

Further, in a case where the optical fiber sensor is bonded onto the surface of the equipment panel while avoiding positions where the thermal control devices are bonded, a position where the optical fiber sensor can be bonded is limited. As a result, there is a problem in that the number of temperature measure points is limited, failing to measure the temperature with high resolution.

The present invention has been made to solve the problems described above, and has an object to provide a honeycomb sandwich structure and a method of manufacturing the honeycomb sandwich structure that enable precise thermal control to be implemented even when a thermal control device is bonded onto a surface of the honeycomb sandwich structure and enable evaluation of a temperature with high resolution and high accuracy.

Solution to Problem

According to one embodiment of the present invention, there is provided a honeycomb sandwich structure, including: face skin materials made of fiber reinforced plastics; and a honeycomb core bonded to the face skin materials through intermediation of adhesive layers, in which each of the adhesive layers has embedded therein an optical fiber sensor structure including: an optical fiber in which at least one sensor portion for detecting a temperature is formed; and a tube for covering the optical fiber.

Further, according to one embodiment of the present invention, there is provided a method of manufacturing the honeycomb sandwich structure, the method including: a first step of inserting the optical fiber into the tube and performing heating under pressure to deform the tube so as to manufacture the optical fiber sensor structure in which the optical fiber and the tube are held in contact with each other; a second step of placing the optical fiber sensor structure, which is manufactured in the first step, on an adhesive surface of each of the face skin materials through intermediation of a first adhesive so that the at least one sensor portion is located at a desired position; a third step of superimposing a second adhesive on the optical fiber sensor structure placed on the adhesive surface through intermediation of the first adhesive in the second step to sandwich the optical fiber sensor structure between the first adhesive and the second adhesive; and a fourth step of placing the honeycomb core on the adhesive surface on which the optical fiber sensor structure sandwiched between the first adhesive and the second adhesive in the third step is placed and performing heating under pressure to bond the optical fiber sensor structure and the honeycomb core to the adhesive surface.

Advantageous Effects of Invention

According to the one embodiment of the present invention, the honeycomb sandwich structure formed of the face skin materials made of fiber reinforced plastics and the honeycomb core has a structure in which the optical fiber sensor structure is embedded in the adhesive layer formed between the face skin materials and the honeycomb core. With this, it is possible to provide the honeycomb sandwich structure and the method of manufacturing the honeycomb sandwich structure that enable precise thermal control to be implemented even when a thermal control device is bonded onto the surface of the honeycomb sandwich structure and enable evaluation of a temperature with high resolution and high accuracy.

DESCRIPTION OF EMBODIMENTS

Now, a honeycomb sandwich structure and a method of manufacturing the honeycomb sandwich structure according to the present invention are described based on exemplary embodiments referring to the accompanying drawings. In the illustration of the drawings, the same components are denoted by the same reference symbols, and the overlapping description thereof is herein omitted.

In the honeycomb sandwich structure according to the invention of this application, an optical fiber sensor structure is linearly embedded in an adhesive layer formed between face skin materials and a honeycomb core. Therefore, the invention of this application has a technical feature to enable precise thermal control to be implemented when a thermal control device is bonded onto a surface of the honeycomb sandwich structure and enable evaluation of a temperature with high resolution and high accuracy. In other words, the invention of this application has a technical feature in that the honeycomb sandwich structure has the structure described above, and therefore specific numerical values described in the following first embodiment are merely examples and do not affect the scope of rights.

First Embodiment

First, a coordinate system used in the following description is described. For an illustration of the honeycomb sandwich structure of the first embodiment, a ribbon direction of honeycomb cells is referred to as the X-direction and a cell-width direction of the honeycomb cells is referred to as the Y-direction as in-plane directions and an out-of-plane direction is referred to as the Z direction. Further, for a coordinate system of face skin materials made of fiber reinforced plastics so as to indicate a direction of orientation of reinforcing fibers in the honeycomb sandwich structure, the X-direction is set as a zero-degree direction of the reinforcing fibers and the Y direction is set as a 90-degree direction of the reinforcing fibers.

Figure 1:
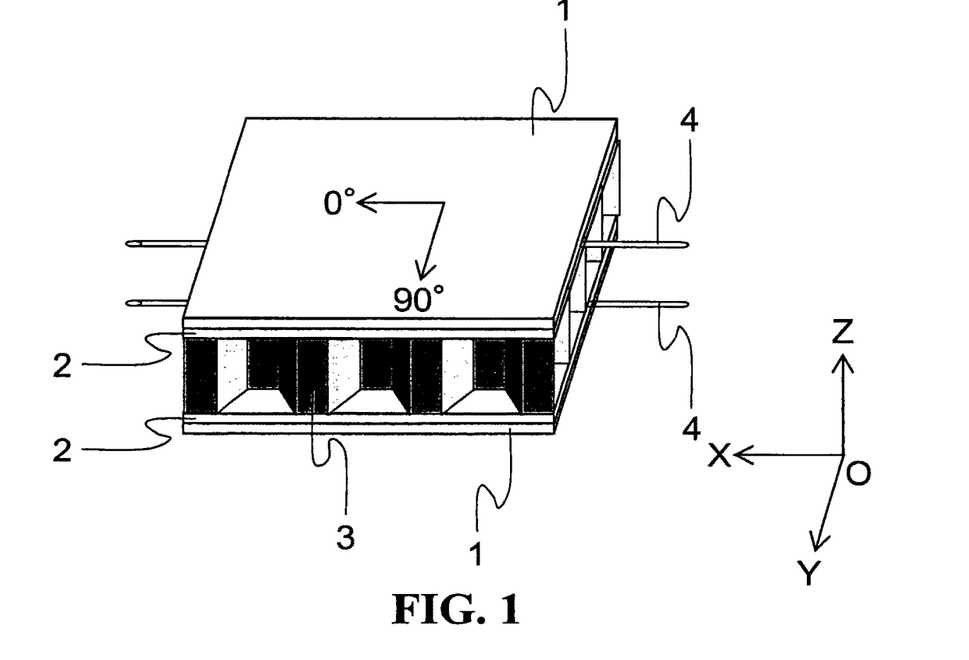
FIG. 1 is a perspective view of a honeycomb sandwich structure according to a first embodiment of the present invention.

Next, the honeycomb sandwich structure according to the first embodiment is described referring to FIG. 1. FIG. 1 is a perspective view of the honeycomb sandwich structure according to the first embodiment of the present invention.

As illustrated in FIG. 1, the honeycomb sandwich structure includes face skin materials 1 made of fiber reinforced plastics (hereinafter referred to simply as "face skin materials 1"), adhesive layers 2, a honeycomb core 3, and optical fiber sensor structures 4. Specifically, the two face skin materials 1 opposed to each other are respectively bonded to both surfaces of the honeycomb core 3 through intermediation of the adhesive layers 2. Inside the adhesive layers 2, the optical fiber sensor structures 4, each being covered with a tube, are respectively embedded.

It is assumed that the optical fiber sensor structures are oriented in the X direction (0-degree direction) as illustrated in FIG. 1. Further, for a specific description, a case where each one of the optical fiber sensor structures 4 is embedded inside each of the two adhesive layers 2 respectively formed on a front surface and a rear surface of the honeycomb core 3 is exemplarily illustrated in FIG. 1.

Further, a honeycomb sandwich structure on which mission equipment is mounted in an artificial satellite is deformed due to generation of a temperature difference between the two face skin materials 1 because of sunlight heat input or heat generation of the mounted equipment. Therefore, at least one optical fiber sensor structure 4 is required to be bonded to each of the face skin materials 1 so that temperatures of the two face skin materials 1 can be measured.

Figure 2:
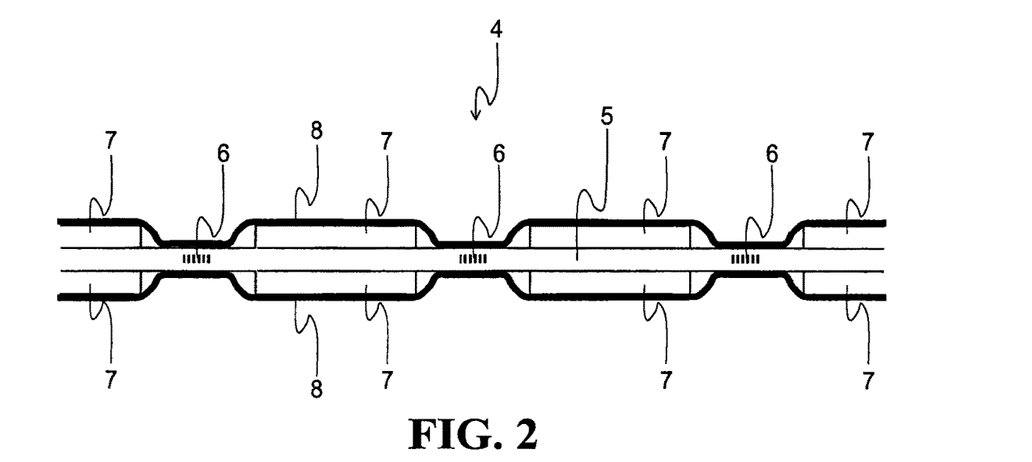
FIG. 2 is a sectional view of an optical fiber sensor structure according to the first embodiment of the present invention.

Next, the optical fiber sensor structure 4 according to the first embodiment is described referring to FIG. 2 to FIG. 5. FIG. 2 is a sectional view of the optical fiber sensor structure 4 according to the first embodiment of the present invention.

Figure 3:
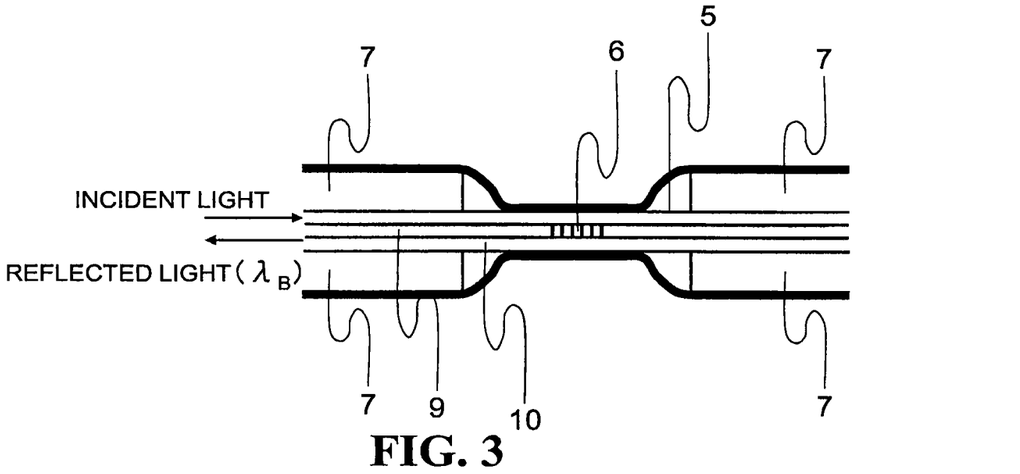
FIG. 3 is an enlarged sectional view of the vicinity of an FBG sensor portion formed in an optical fiber according to the first embodiment of the present invention.
Figure 4:
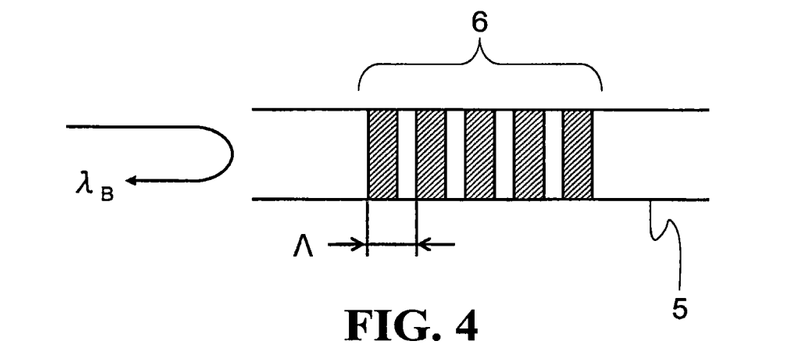
FIG. 4 is an explanatory diagram for illustrating a structure of the FBG sensor portion according to the first embodiment of the present invention.
Figure 5:
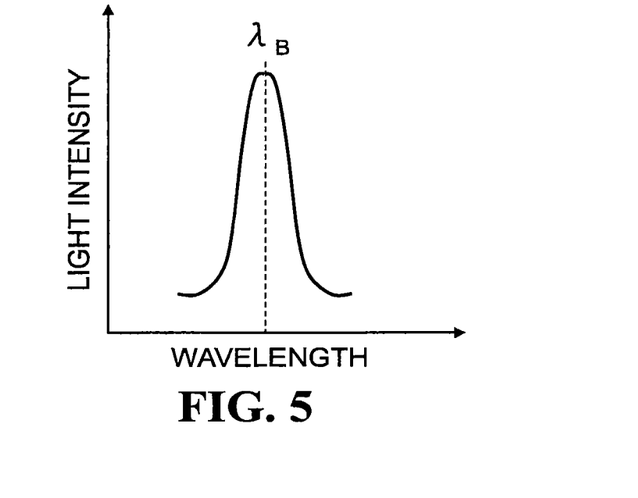
FIG. 5 is a graph for showing a characteristic of a reflectance spectrum of the FBG sensor portion according to the first embodiment of the present invention.

FIG. 3 is an enlarged sectional view of the vicinity of an FBG sensor portion 6 formed in an optical fiber 5 according to the first embodiment of the present invention. FIG. 4 is an explanatory diagram for illustrating a structure of the FBG sensor portion 6 according to the first embodiment of the present invention. FIG. 5 is a graph for showing a characteristic of a reflectance spectrum of the FBG sensor portion 6 according to the first embodiment of the present invention.

The sectional view of the optical fiber sensor structure 4, which corresponds to FIG. 2, is an illustration of a cross section in parallel to the direction of orientation (X-direction) of the optical fiber sensor structure 4 illustrated in FIG. 1 referred to above (namely, parallel to the X-Z plane). The enlarged view of the vicinity of the FBG sensor portion 6, which corresponds to FIG. 3, is an illustration of the vicinity of the FBG sensor portion 6 illustrated in the sectional view of the optical fiber sensor structure 4, which corresponds to FIG. 2, in an enlarged manner.

As illustrated in FIG. 2, the optical fiber sensor structure 4 for detecting a temperature includes the optical fiber 5 including the FBG sensor portions 6, coatings 7, and a resin tube 8 (tube).

Here, the FBG sensor portion 6 is a fiber Bragg grating portion formed in the optical fiber 5, and one or more FBG sensor portions 6 are provided at intervals secured therebetween so as to be connected in series through the optical fiber 5. For a specific description, FIG. 2 is an exemplary illustration of a case where three FBG sensor portions 6 are arranged at intervals secured therebetween.

Further, as illustrated in FIG. 2, the optical fiber 5 in which the FBG sensor portions 6 are formed (located) is not covered with the coating 7 (the coating 7 is removed therefrom), whereas the optical fiber 5 in which the FBG sensor portions 6 are not formed (not located) is covered with the coatings 7. Further, the optical fiber 5 is entirely (including the portions covered with the coatings 7 and the portions not covered therewith) covered with the resin tube 8.

Specifically, as illustrated in FIG. 3, the optical fiber 5 includes a core 9 and a clad 10 that covers an outer circumference of the core 9. Inside the core 9, the FBG sensor portions 6 are formed. An outer circumference of the clad 10 is covered with the coatings 7, whereas the coating 7 is removed from the vicinity of the FBG sensor portions 6 to expose the clad 10.

Further, the entire structure illustrated in FIG. 3 is covered with the resin tube 8. By using the resin tube 8 as described above, temperature measurement with the optical fiber sensor structures 4 being bonded to the honeycomb sandwich structure is not affected by a strain in the honeycomb sandwich structure. Further, the optical fibers 5 are fixed, and hence the positions of the FBG sensor portions 6 do not shift in an axial direction of the optical fibers 5. Therefore, the temperature of the honeycomb sandwich structure can be precisely measured.

Although the resin tube 8 that is a tube made of a resin is exemplarily described as a tube for covering the optical fiber 5 and the coatings 7, the tube is not limited thereto. Specifically, the tube may be any tube as long as the temperature measurement is not affected by the strain in the honeycomb sandwich structure when being bonded to the honeycomb sandwich structure for the temperature measurement and the optical fibers 5 are fixed thereto. For example, a tube made of a metal may also be used.

For sizes of the portions of the optical fiber 5, for example, a diameter of the entire optical fiber 5 with the coating 7 can be set to about 250 μm, a diameter of the clad 10 can be set to about 125 μm, and a diameter of the core 9 can be set to about 10 μm. However, the sizes are not limited thereto. Further, although each of the plurality of the FBG sensor portions 6 can be formed in the core 9 over a range of, for example, about 5 mm, the range is not limited thereto. As described above, the optical fiber having the numerical values described in the first embodiment is merely an example, and the invention of this application is also applicable to optical fibers having numerical values other than those described herein.

Further, the FBG sensor portions 6 are formed in the core 9 so that a refractive index changes periodically in a longitudinal direction (direction of orientation) of the optical fiber 5 and have a characteristic in that a steep reflectance spectrum characteristic is obtained. Specifically, a refractive index of the core 9 changes with a period length A as illustrated in FIG. 4, and the steep reflectance spectrum characteristic is obtained as shown in FIG. 5. A light intensity becomes the largest at a center wavelength (Bragg wavelength: $\lambda_B$) of the reflectance spectrum.

Here, a relationship between the center wavelength (Bragg wavelength: $\lambda_B$) of the reflectance spectrum, the period A, and a reflective index n is expressed by Expression (1). Further, the refractive index n depends on the temperature, whereas the period λ depends on the temperature and the strain.

$$\lambda_B = 2n\lambda \quad (1)$$

Therefore, the optical fiber sensor structure 4 is formed to have a structure in which the optical fiber 5 and the coatings 7 are covered with the resin tube 8 so as not to be affected by the strain in the honeycomb sandwich structure. At the same time, in a state in which the optical fiber sensor structures 4 are embedded in the adhesive layers 2, the Bragg wavelength $\lambda_B$ is measured. In this manner, the temperature can be precisely obtained from Expression (1). As described above, the FBG sensor portions 6 formed in the optical fiber 5 can be used as temperature sensors.

The vicinity of each of the FBG sensor portions 6 may be covered with the coating 7. Even in such a case, the temperature can be precisely measured as compared with the related art. In a case where the optical fiber 5 in which the FBG sensor portions 6 are formed is not covered with the coating 7, however, information of the temperature of the honeycomb sandwich structure can be more precisely transmitted to the FBG sensor portions 6. Therefore, in order to measure the temperature with higher accuracy, the optical fiber 5 in which the FBG sensor portions 6 are formed is preferably not covered with the coating 7.

Figure 6:
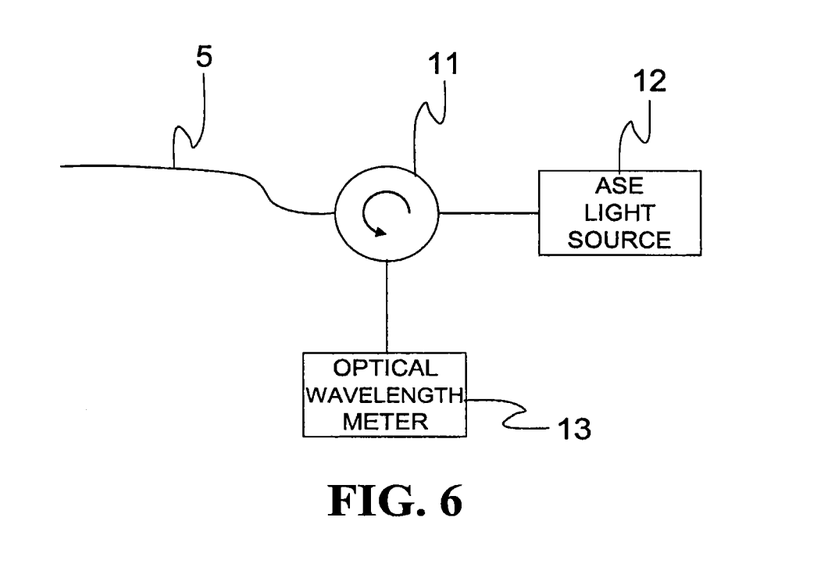
FIG. 6 is a block diagram of a temperature measurement system using the optical fiber sensor structure according to the first embodiment of the present invention.

Next, an example of a temperature measurement system for evaluating the temperature of the honeycomb sandwich structure is described referring to FIG. 6. FIG. 6 is a block diagram of the temperature measurement system using the optical fiber sensor structure 4 according to the first embodiment of the present invention.

As illustrated in FIG. 6, the temperature measurement system includes the optical fiber 5, an optical circulator 11, an amplifier spontaneous emission (ASE) light source 12, and an optical wavelength meter 13.

For the measurement of the temperature of the honeycomb sandwich structure, the optical circulator 11 for converting an optical path is connected to a base end portion of the optical fiber 5. Further, the ASE light source 12 that is a broadband light source and the optical wavelength meter 13 that is a wavelength measurement device are connected to the optical circulator 11.

By configuring the system described above, the Bragg wavelength $\lambda_B$ can be specifically measured. Further, as described above, the measurement of the Bragg wavelength $\lambda_B$ allows the temperature of the honeycomb sandwich structure to be obtained from Expression (1).

Next, the method of manufacturing the honeycomb sandwich structure according to the first embodiment is described referring to FIG. 7 to FIG. 11.

Figure 7:
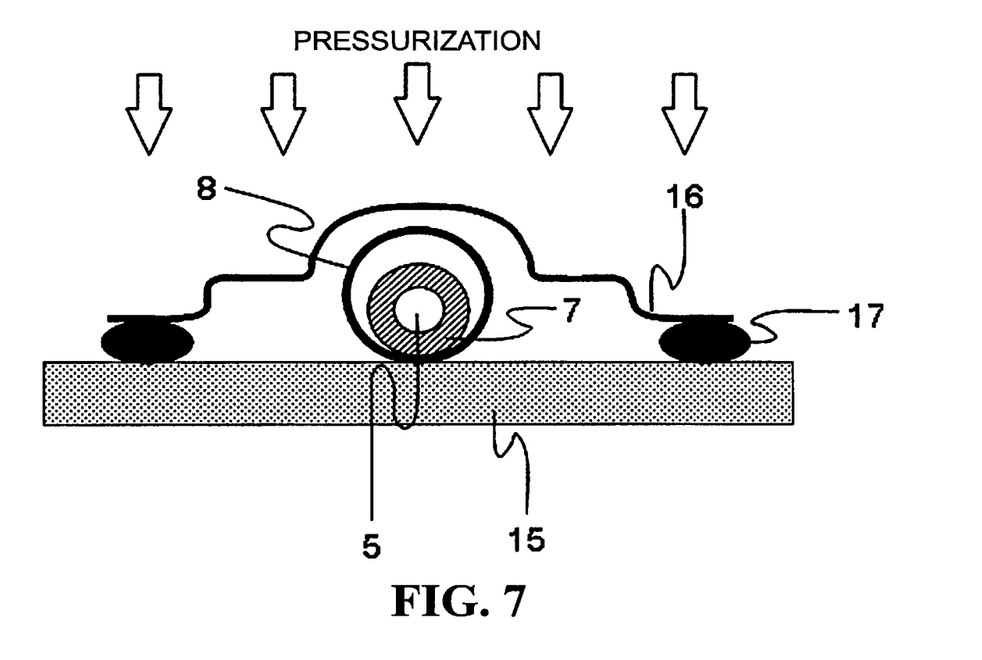
FIG. 7 is an explanatory diagram for illustrating a state of pressurization of the optical fiber and a resin tube according to the first embodiment of the present invention.

First, manufacture of the optical fiber sensor structure 4 by covering the optical fiber 5 with the resin tube 8 is described referring to FIG. 7 and FIGS. 8A, 8B and 8C. FIG. 7 is an explanatory diagram for illustrating a state of pressurization of the optical fiber 5 and the resin tube 8 according to the first embodiment of the present invention. In FIG. 7, a cross section of the optical fiber 5 covered with the coating 7 is illustrated as a representative example.

Figure 8A:
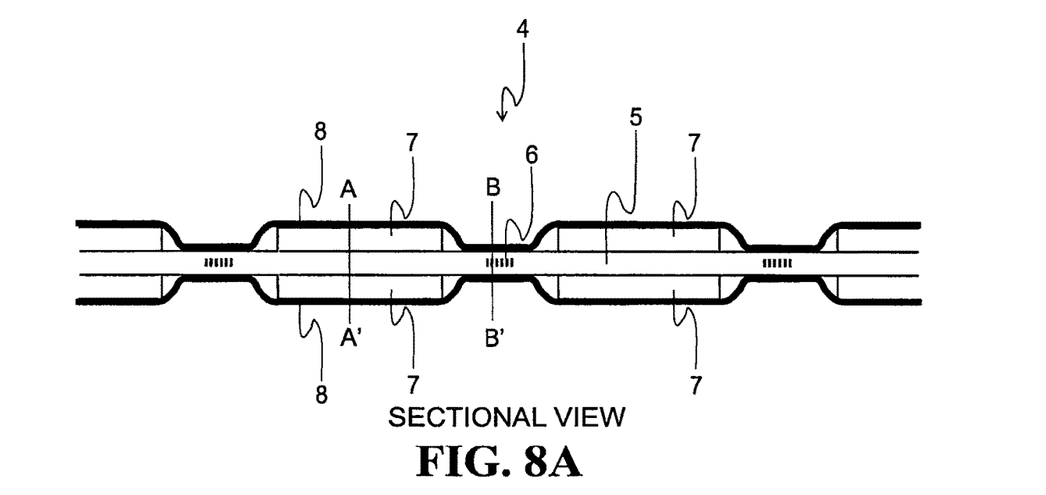
FIGS. 8A, 8B and 8C are explanatory diagrams for illustrating a positional relationship between the optical fiber and the resin tube in the optical fiber sensor structure according to the first embodiment of the present invention.
Figure 8B:
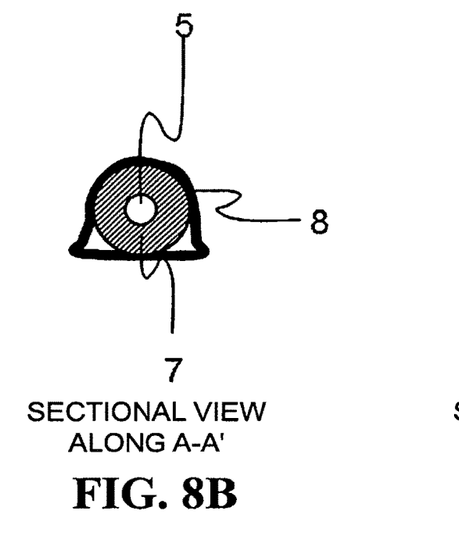
Figure 8C:
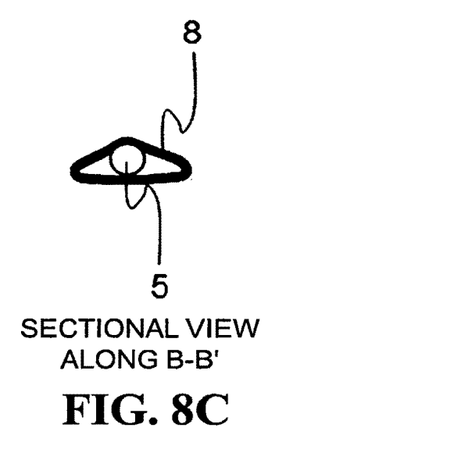

FIGS. 8A, 8B and 8C are explanatory diagrams for illustrating a positional relationship between the optical fiber 5 and the resin tube 8 in the optical fiber sensor structure 4 according to the first embodiment of the present invention. FIG. 8A is a sectional view of the optical fiber sensor structure 4 illustrated in FIG. 2 referred to above, FIG. 8B is a sectional view taken along the line A-A' of FIG. 8A, and FIG. 8C is a sectional view taken along the line B-B' of FIG. 8A.

Here, for the measurement of the temperature of the honeycomb sandwich structure with higher accuracy, the coating 7 is removed so that the optical fiber 5 in which the FBG sensor portions 6 are formed is not covered with the coating 7 to achieve a state in which the vicinity of each of the FBG sensor portions 6 is exposed in advance, as described above.

As illustrated in FIG. 7, after the optical fiber 5 is inserted into the resin tube 8 that is coaxial therewith, placed on a surface plate 15, entirely covered with a bagging film 16, and sealed with a sealing material 17, interior (sealed space) is brought into a vacuum state by a pump (not shown). Further, in this state, heating is performed under pressure (for example, at an atmospheric pressure (about 1 atm)) on the bagging film 16.

As described above, through the heating of the optical fiber 5 under pressure after being inserted into the resin tube 8, the optical fiber sensor structure 4 can be manufactured. Specifically, as illustrated in FIG. 8A, the optical fiber 5 is covered with the resin tube 8 in a state in which the resin tube 8 is deformed in conformity with a shape of the optical fiber 5 in the optical fiber sensor structure 4.

Further, as illustrated in FIG. 8B, the optical fiber 5 that is covered with the coating 7 is not held in direct contact with the resin tube 8, whereas the coating 7 is held in direct contact with the resin tube 8. On the other hand, as illustrated in FIG. 8C, the optical fiber 5 that is not covered with the coating 7 (namely, the optical fiber 5 in which the FBG sensor portion 6 is formed) is held in direct contact with the resin tube 8.

Therefore, in a case where the optical fiber sensor structure 4 is embedded in the adhesive layer 2, heat is transferred through the resin tube 8 to the optical fiber 5 that is held in contact with the resin tube 8. In other words, the optical fiber 5 in which the FBG sensor portion 6 is formed has a smaller thermal resistance in a vertical direction (vertical direction in the drawing sheet) by the amount that is not covered with the coating 7 as compared with the optical fiber 5 covered with the coating 7. Therefore, the temperature of the honeycomb sandwich structure is precisely measured by the FBG sensor portions 6.

Figure 9:
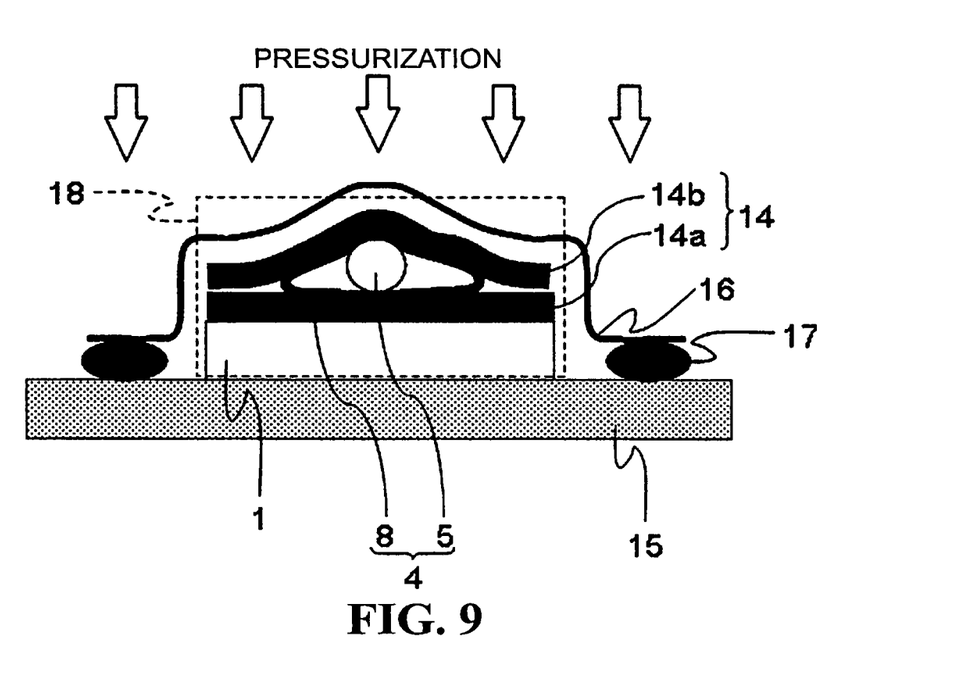
FIG. 9 is an explanatory diagram for illustrating a state in which the optical fiber sensor structure is temporarily joined to a face skin material according to the first embodiment of the present invention.

Next, temporary joint of the optical fiber sensor structure 4 to the face skin materials 1 is described referring to FIG. 9. FIG. 9 is an explanatory diagram for illustrating a state in which the optical fiber sensor structure 4 is temporarily joined to the face skin materials 1 according to the first embodiment of the present invention. In FIG. 9, a cross section of the optical fiber 5 in which the FBG sensor portion 6 is formed as illustrated in FIG. 8C referred to above is illustrated as a representative example.

In this case, a first forming material 18 including the face skin materials 1 and the optical fiber sensor structure 4 sandwiched between two film-like adhesives 14 (a first adhesive 14a and a second adhesive 14b) is pressurized so as to temporarily join the optical fiber sensor structure 4 sandwiched between the two film-like adhesives 14 to the face skin materials 1.

Specifically, as illustrated in FIG. 9, after the optical fiber sensor structure 4 is placed on the first adhesive 14a superimposed on a surface of the face skin materials 1 placed on the surface plate 15 so that the FBG sensor portions 6 are located at desired positions, the second adhesive 14b is further superimposed thereon. As described above, by being sandwiched between the two film-like adhesives 14, the optical fiber sensor structure 4 can be bonded in an embedded state in the adhesive layer 2 when being bonded to the face skin materials 1. The surface of the face skin materials 1, onto which the optical fiber sensor structure 4 is bonded, corresponds to a surface on which the honeycomb core 3 is bonded.

Subsequently, after the entirety is covered with the bagging film 16 and is sealed with the sealing material 17, interior (sealed space) is evacuated by the pump (not shown). Further, the bagging film 16 is pressurized from above at, for example, the atmospheric pressure (about 1 atm) in this state to achieve close contact. Through the steps described above, the optical fiber sensor structure 4 sandwiched between the two film-like adhesives 14 is temporarily joined to the face skin materials 1.

Figure 10:
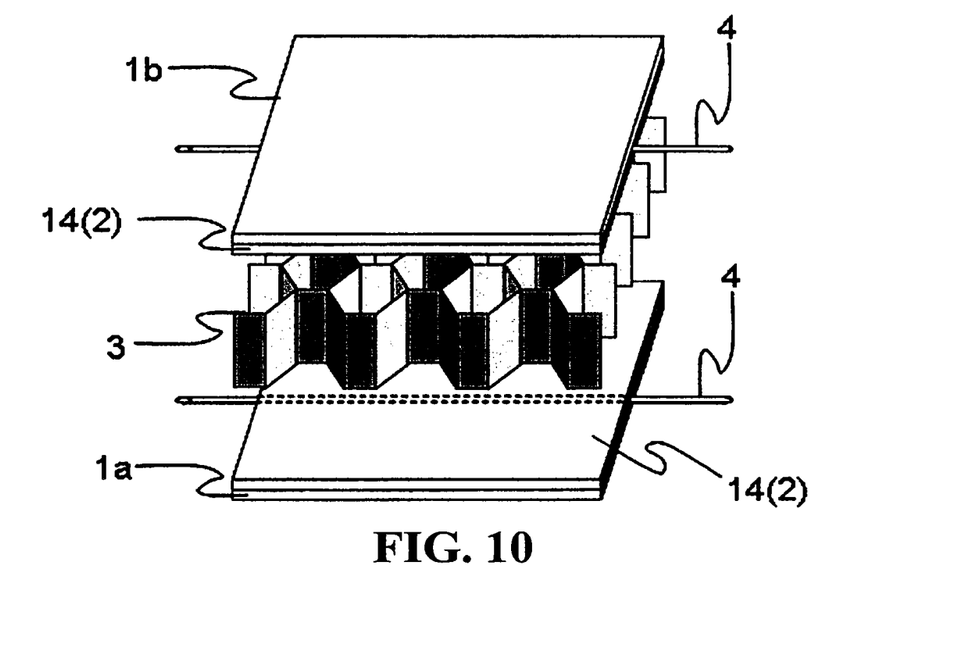
FIG. 10 is an explanatory diagram for illustrating steps of manufacturing the honeycomb sandwich structure according to the first embodiment of the present invention.

Next, steps of manufacturing the honeycomb sandwich structure are described referring to FIG. 10. FIG. 10 is an explanatory diagram for illustrating the steps of manufacturing the honeycomb sandwich structure according to the first embodiment of the present invention. The steps of manufacturing the optical fiber sensor structure 4 have been described above, and therefore the description thereof is herein omitted.

First, as a first step, the two face skin materials 1 to each of which the optical fiber sensor structure 4 is temporarily joined through intermediation of the two film-like adhesives 14 (the first adhesive 14a and the second adhesive 14b) as described above are manufactured as a first face skin material 1a and a second face skin material 1b.

Next, as a second step, the honeycomb core 3 is placed on the second adhesive 14b of the first face skin material 1a manufactured in the first step. Subsequently, as a third step, the second face skin material 1b manufactured in the first step is placed on the honeycomb core 3 placed on the second adhesive 14b of the first face skin material 1a in the second step in a state in which the second adhesive 14b of the second face skin material 1b is oriented downward.

Further, as a final fourth step, heating is performed under pressure. As a result, the temporarily joined optical fiber sensor structures 4 are bonded to the face skin materials 1. Further, the face skin materials 1 and the honeycomb core 3 are bonded to each other. In this manner, the honeycomb sandwich structure including the optical fiber sensor structures 4 is manufactured. The two film-like adhesives 14 serving to bond the face skin materials 1 and the honeycomb core 3 correspond to each of the adhesive layers 2.

Next, details of the second step to the fourth step described above are described referring to FIG. 11 and FIGS. 12A and 12B.

Figure 11:
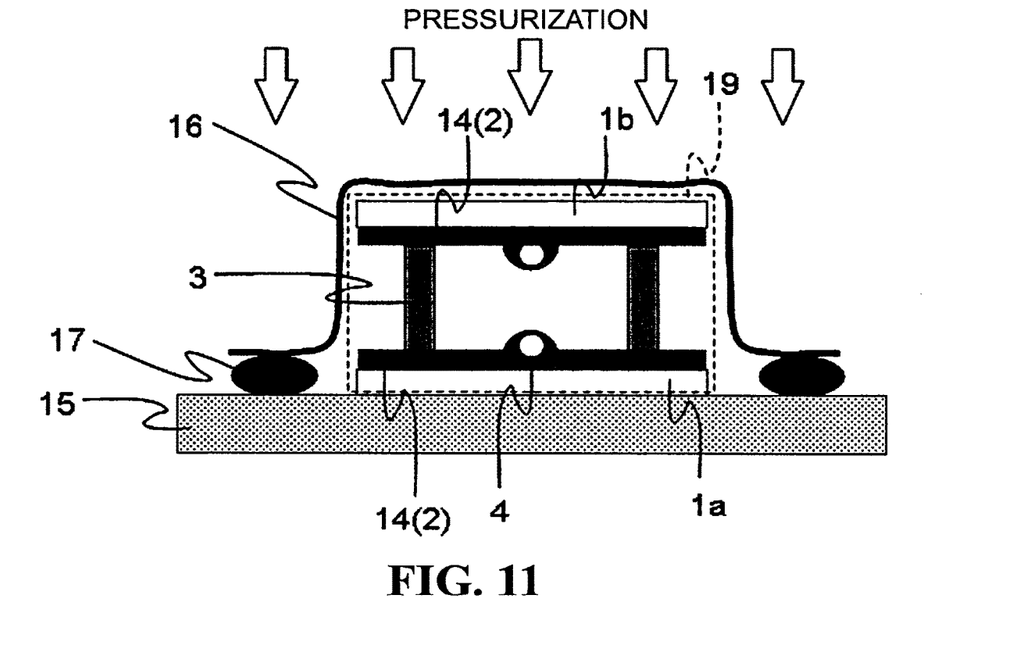
FIG. 11 is an explanatory diagram for illustrating a state in which the honeycomb sandwich structure is formed by bonding the optical fiber sensor structures to the face skin materials and bonding a honeycomb core thereto according to the first embodiment of the present invention.
Figures 12A, 12B:
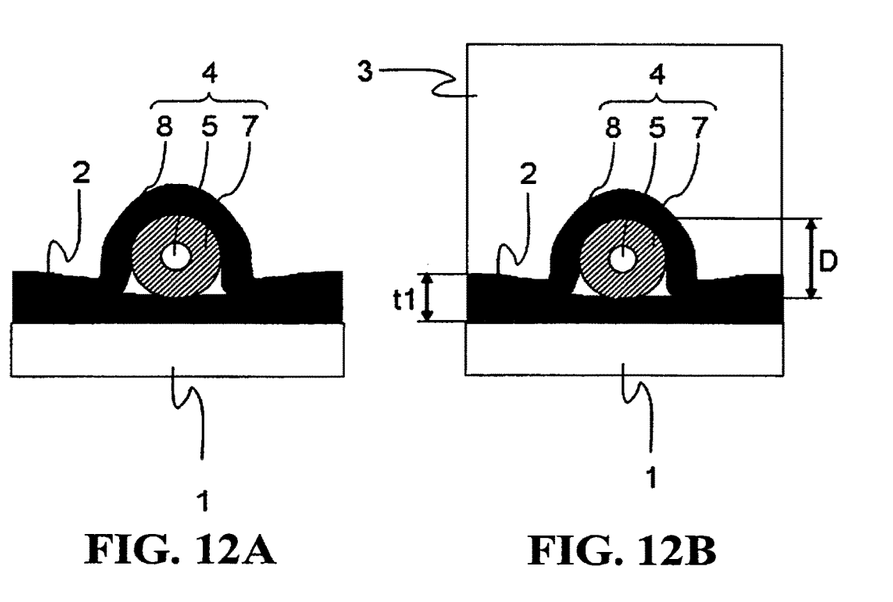
FIGS. 12A and 12B are explanatory diagrams for illustrating a positional relationship between an adhesive layer, the honeycomb core, and the optical fiber sensor structure in the honeycomb sandwich structure according to the first embodiment of the present invention.

FIG. 11 is an explanatory diagram for illustrating a state in which the honeycomb sandwich structure is formed by bonding the optical fiber sensor structures 4 to the face skin materials 1 and bonding the honeycomb core 3 thereto according to the first embodiment of the present invention. FIGS. 12A and 12B are explanatory diagrams for illustrating a positional relationship between the adhesive layer 2, the honeycomb core 3, and the optical fiber sensor structure 4 in the honeycomb sandwich structure according to the first embodiment of the present invention. FIG. 12A is a sectional view for illustrating a case where the honeycomb core 3 is not present on a top of the optical fiber sensor structure 4, whereas FIG. 12B is a sectional view for illustrating a case where the honeycomb core 3 is present on the top of the optical fiber sensor structure 4.

Here, a second forming material 19 including the two face skin materials 1 to each of which the optical fiber sensor structure 4 is temporarily joined and the honeycomb core 3 sandwiched therebetween is heated under pressure to manufacture the honeycomb sandwich structure. As an example of the honeycomb core 3, for example, a honeycomb core made of an aluminum alloy having a cell size of ⅜ inches, a height of 25.4 mm, and a foil thickness of 0.018 mm only needs to be used.

Specifically, as illustrated in FIG. 11, the second forming material 19 is placed on the surface plate 15 so that the optical fiber sensor structures 4 (the adhesives 14) respectively temporarily joined to the two face skin materials 1 (the first face skin material 1a and the second face skin material 1b) are opposed to each other through intermediation of the honeycomb core 3. By achieving the positional relationship described above, both surfaces of the honeycomb core 3 are held in contact with the adhesives 14 of the respective surface materials 1.

Subsequently, after the entirety is covered with the bagging film 16 and is sealed with the sealing material 17, the interior (sealed space) is evacuated by the pump (not shown). Further, in this state, the heating is performed under pressure (for example, at the atmospheric pressure (about 1 atm)) on the bagging film 16. In this case, the film-like adhesives 14 only need to be cured by heating at, for example, 120° C. Through the steps described above, the temporarily joined optical fiber sensor structures 4 are bonded to the face skin materials 1 in a state of being respectively embedded in the adhesive layers 2. Further, the honeycomb core 3 is bonded in a state of being sandwiched between the two face skin materials 1.

Here, as illustrated in FIG. 12A, a diameter D of the optical fiber sensor structure 4 is larger than a thickness t1 of the adhesive layer 2. Therefore, the adhesive layer 2 is formed in conformity with a shape of the optical fiber sensor structure 4. Further, as illustrated in FIG. 12B, when the honeycomb core 3 is present immediately above the optical fiber sensor structure 4, the honeycomb core 3 is bonded to the face skin materials 1 in a state of being deformed in conformity with the shape of the optical fiber sensor structure 4 through intermediation of the adhesive layer 2. In FIGS. 12A and 12B, the cross section of the optical fiber 5 covered with the coating 7 is illustrated as a representative example. Even for a cross section of the optical fiber 5 that is not covered with the coating 7, the diameter D of the optical fiber sensor structure 4 is larger than the thickness t1 of the adhesive layer 2. Therefore, the same applies thereto.

Although, for example, carbon fiber reinforced plastics formed of carbon fibers M60J (manufactured by Toray Industries, Inc.) and an epoxy resin curable at 170° C. can be used as a material of the face skin materials 1, the material is not limited thereto. Specifically, a composition of the carbon fiber reinforced plastics available herein is not limited to the combination of the carbon fibers M60J and the epoxy resin curable at 170° C., and any combination may be used therefor. Further, a sheet-like "prepreg" in a semi-cured state, which is manufactured by impregnating a plurality of bundled reinforcing fibers with a resin, may be used. As described above, the combination of the fibers and the resin forming the carbon fiber reinforced plastics as described herein is merely an example, and the invention of this application is also applicable to carbon fiber reinforced plastics formed of another combination.

Further, although, for example, an epoxy adhesive that has a thickness of 60 μm and is curable at 180° C. may be used as the film-like adhesive 14, the adhesive is not limited thereto. The film-like adhesive 14 only needs to be a thermally curable resin, and therefore a liquid adhesive may be used.

Further, in the forming material 18 including the face skin materials 1, the film-like adhesives 14, and the optical fiber sensor structure 4, the optical fiber sensor structure 4 is sandwiched between the two film-like adhesives 14. However, the forming material 18 is not limited thereto. For example, a liquid adhesive may be applied to the optical fiber sensor structure 4, and then a film adhesive may be used for bonding.

Further, although, for example, a length can be set to 5 mm as a grating length of the FBG sensor portion 6, the length is not limited thereto. Any length may be set as long as the length falls within a range of from about 1 mm to about 10 mm.

As described above, according to the first embodiment, the optical fiber sensor is embedded in the adhesive layer that bonds the face skin materials made of fiber reinforced plastics and the honeycomb core. As a result, the honeycomb sandwich structure that enables thermal control devices to be bonded to the surface of the structure to allow precise thermal control and also enables evaluation of the temperature of the structure with high resolution and high accuracy.

In the optical fiber of the optical fiber sensor structure, the FBG sensor portion having the Bragg wavelength of the reflectance spectrum changing in accordance with the temperature and the strain is formed. In this manner, the temperature of the honeycomb sandwich structure can be measured by the optical fiber sensor structure.

The optical fiber sensor structure formed so that a diameter of the vicinity of the FBG sensor portion and a diameter of the other portion differ from each other is inserted into the resin tube that is coaxial therewith, and is then heated under pressure so that the resin tube is deformed to come into contact with the optical fiber in which the FBG sensor portion is formed. As a result, in the optical fiber sensor structure, the position of the FBG sensor portion does not shift in the axial direction of the optical fiber. Further, a structure with a small thermal resistance in the out-of-plane direction is realized in the FBG sensor portion. Therefore, the temperature of the honeycomb sandwich structure can be more precisely measured as compared with the related art.

Further, after a pre-step in which the adhesive layer is superimposed on the face skin materials, the optical fiber sensor structure is placed at a predetermined position on the adhesive layer, and the adhesive layer is superimposed thereon, a step of bonding the face skin materials and the honeycomb core is carried out to manufacture the honeycomb sandwich structure. As a result, the optical fiber sensor structure including the FBG sensor portion therein can be embedded inside the adhesive layer without allowing the FBG sensor portion to be shifted in the axial direction of the optical fiber and lowering the thermal conduction in the out-of-plane direction. Thus, the temperature can be measured with high resolution and high accuracy.

Although the optical fiber in which at least one FBG sensor portion 6 is formed is exemplarily described as an example of the optical fiber 5 forming the optical fiber sensor structure 4 in the first embodiment, the optical fiber is not limited thereto. The invention of this application is also applicable to another optical fiber capable of detecting the temperature of the structure. For example, the invention of this application is applicable to light scattering type optical fiber sensors for three types of light scattering, that is, Rayleigh scattering, Raman scattering, and Brillouin scattering. Further, when a portion in which the sensor portion for measuring the temperature is formed is not covered with the coating in a similar manner in other optical fibers, the temperature can be measured with higher accuracy.

The invention claimed is:

1. A honeycomb sandwich structure, comprising:
   face skin materials made of fiber reinforced plastics; and
   a honeycomb core bonded to the face skin materials through intermediation of adhesive layers,
   wherein each of the adhesive layers has embedded therein an optical fiber sensor structure comprising:
      an optical fiber in which at least one sensor portion for detecting a temperature of the honeycomb sandwich structure is formed; and
      a tube for covering the optical fiber.

2. The honeycomb sandwich structure according to claim 1, wherein the optical fiber in which the at least one sensor portion is located is not covered with a coating inside the tube, whereas the optical fiber in which the at least one sensor portion is not located is covered with the coating inside the tube.

3. The honeycomb sandwich structure according to claim 1, wherein the optical fiber comprises at least one fiber Bragg grating (FBG) sensor portion formed as the at least one sensor portion.

4. The honeycomb sandwich structure according to claim 1, wherein the tube comprises a tube made of a resin or a metal.

* * * * *